United States Patent
Shimizu et al.

(10) Patent No.: US 8,928,909 B2
(45) Date of Patent: Jan. 6, 2015

(54) STARTUP OPERATION CONTROL APPARATUS, IMAGE PROCESSING APPARATUS, STARTUP OPERATION CONTROL METHOD, AND NON-TRANSITORY COMPUTER READABLE MEDIUM

(71) Applicant: Fuji Xerox Co., Ltd., Minato-ku, Tokyo (JP)

(72) Inventors: Kenichiro Shimizu, Kanagawa (JP); Teiju Sato, Kanagawa (JP); Michihisa Nezu, Kanagawa (JP); Masato Saito, Kanagawa (JP); Tatsuo Mishima, Kanagawa (JP); Hideki Nojo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 14/013,759

(22) Filed: Aug. 29, 2013

(65) Prior Publication Data

US 2014/0268251 A1 Sep. 18, 2014

(30) Foreign Application Priority Data

Mar. 12, 2013 (JP) ................................. 2013-049220

(51) Int. Cl.
*H04N 1/00* (2006.01)
(52) U.S. Cl.
CPC ................................. *H04N 1/00896* (2013.01)
USPC .............. 358/1.14; 358/1.16; 399/37; 399/88
(58) Field of Classification Search
None
See application file for complete search history.

(56) References Cited

U.S. PATENT DOCUMENTS

| | | | | | |
|---|---|---|---|---|---|
| 4,843,289 | A | * | 6/1989 | Mogi et al. | 318/600 |
| 5,384,491 | A | * | 1/1995 | Suizu | 307/113 |
| 5,551,077 | A | * | 8/1996 | Oda | 455/343.6 |
| 6,055,068 | A | * | 4/2000 | Abe et al. | 358/468 |
| 6,225,709 | B1 | * | 5/2001 | Nakajima | 307/66 |
| 8,081,339 | B2 | * | 12/2011 | Tsukada | 358/1.16 |
| 8,314,957 | B2 | * | 11/2012 | Hirano | 358/1.14 |
| 2002/0027508 | A1 | * | 3/2002 | Baba | 340/693.2 |
| 2004/0050265 | A1 | * | 3/2004 | Hasegawa et al. | 101/116 |
| 2006/0101294 | A1 | * | 5/2006 | Lee et al. | 713/300 |
| 2009/0284792 | A1 | * | 11/2009 | Hirano | 358/1.15 |
| 2012/0194832 | A1 | * | 8/2012 | Kitagawa | 358/1.9 |
| 2014/0164798 | A1 | * | 6/2014 | Zhang et al. | 713/320 |

FOREIGN PATENT DOCUMENTS

JP 2007-243547 A 9/2007
JP 2012-175496 A 9/2012

* cited by examiner

*Primary Examiner* — Kimberly A Williams
(74) *Attorney, Agent, or Firm* — Sughrue Mion, PLLC

(57) ABSTRACT

A startup operation control apparatus includes a main-power-source operation unit, a determining unit, a memory, and a controller. The main-power-source operation unit is operated to supply and shut off power from a power source. The determining unit determines whether or not the main-power-source operation unit has been operated. The memory stores, every time an operation mode of a processing device that operates by receiving power supply from the power source changes, information representing the changed operation mode in an updating manner. If the determining unit determines, upon a shift from a power shutoff state to a power supply state, that the main-power-source operation unit has not been operated, the controller performs control so that the processing device operates in the operation mode represented by the information stored in the memory.

8 Claims, 9 Drawing Sheets

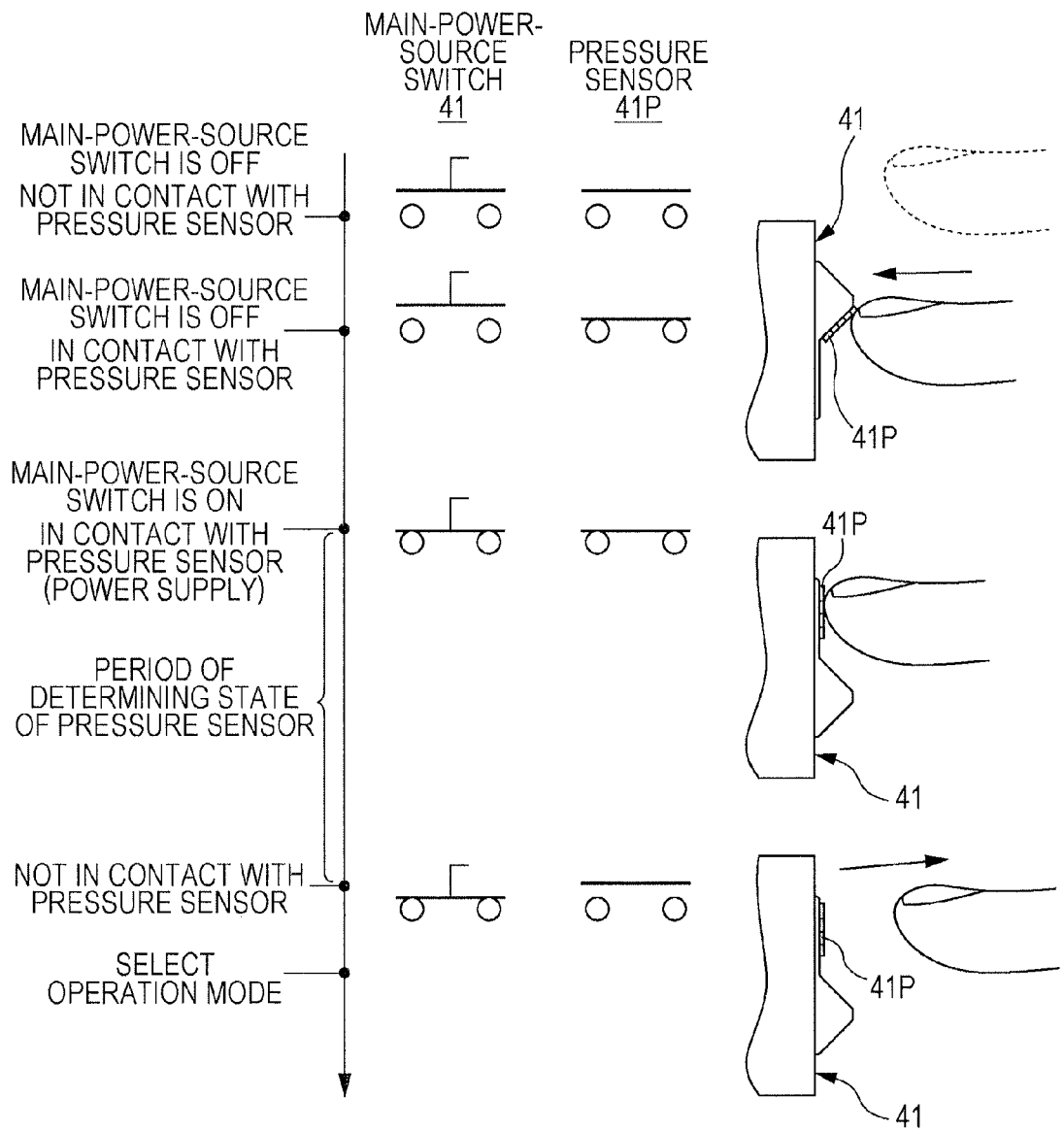

STARTUP OPERATION CONTROL APPARATUS, IMAGE PROCESSING APPARATUS, STARTUP OPERATION CONTROL METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-049220 filed Mar. 12, 2013.

BACKGROUND

Technical Field

The present invention relates to a startup operation control apparatus, an image processing apparatus, a startup operation control method, and a non-transitory computer readable medium.

SUMMARY

According to an aspect of the invention, there is provided a startup operation control apparatus including a main-power-source operation unit, a determining unit, a memory, and a controller. The main-power-source operation unit is operated to supply and shut off power from a power source. The determining unit determines whether or not the main-power-source operation unit has been operated. The memory stores, every time an operation mode of a processing device that operates by receiving power supply from the power source changes, information representing the changed operation mode in an updating manner. If the determining unit determines, upon a shift from a power shutoff state to a power supply state, that the main-power-source operation unit has not been operated, the controller performs control so that the processing device operates in the operation mode represented by the information stored in the memory.

BRIEF DESCRIPTION OF THE DRAWINGS

Exemplary embodiments of the present invention will be described in detail based on the following figures, wherein:

FIG. 10 is a timing chart illustrating a flow of control for determining whether or not the main-power-source switch has been operated according to the second exemplary embodiment.

DETAILED DESCRIPTION

First Exemplary Embodiment

Figure 1:
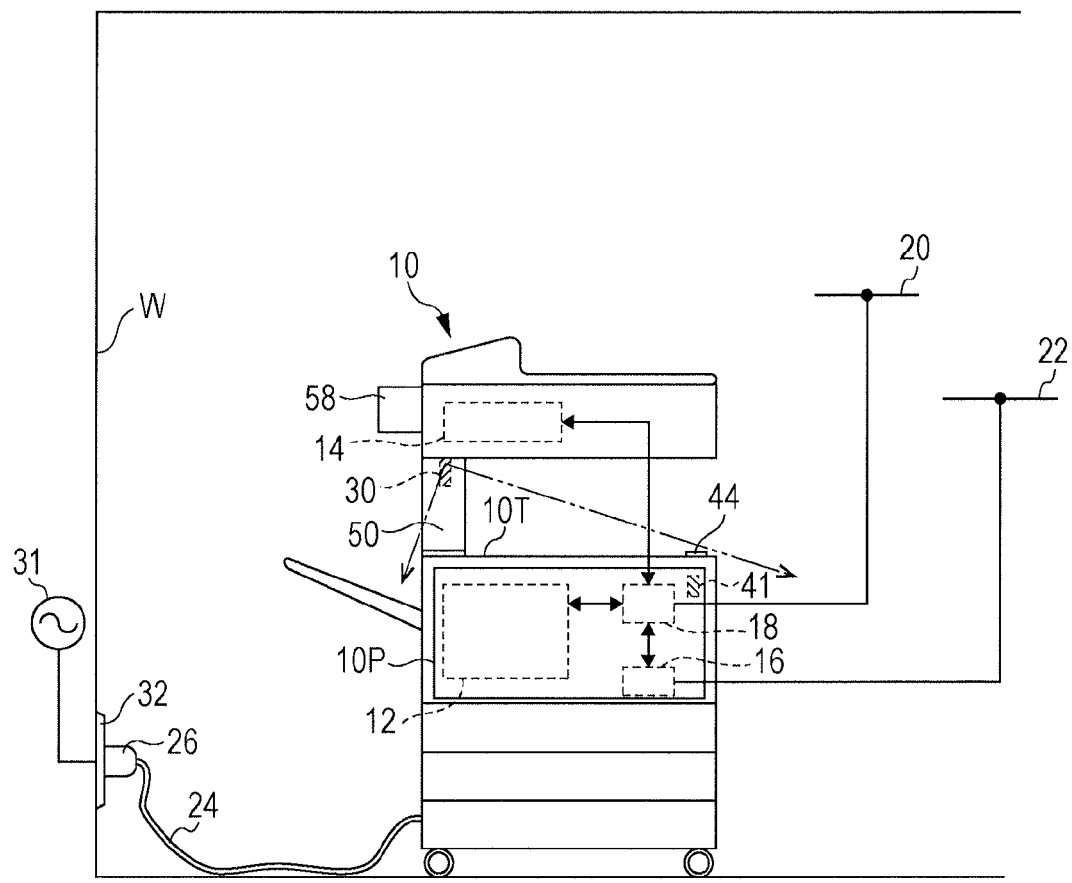
FIG. 1 is a schematic diagram illustrating an image processing apparatus according to a first exemplary embodiment.

FIG. 1 illustrates an image processing apparatus 10 according to a first exemplary embodiment.

The image processing apparatus 10 includes processing devices including an image forming unit 12 that forms an image on recording paper, an image reading unit 14 that reads a document image, and a facsimile communication control circuit 16 (hereinafter, these processing devices may be collectively referred to as "devices"). A recording paper output tray 10T, to which recording paper on which an image has been recorded by the image forming unit 12 is output, is disposed between the image reading unit 14 and the other devices (the image forming unit 12 and the facsimile communication control circuit 16).

The image processing apparatus 10 includes a main controller 18. The main controller 18 controls the image forming unit 12, the image reading unit 14, and the facsimile communication control circuit 16, and, for example, temporarily stores image data of a document image read by the image reading unit 14, and outputs the read image data to the image forming unit 12 or the facsimile communication control circuit 16.

The main controller 18 is connected to a communication network 20 such as the Internet, and the facsimile communication control circuit 16 is connected to a telephone network 22. The main controller 18 is connected to, for example, a personal computer (PC) 29 (see FIG. 2) via the communication network 20, and receives image data. Also, the main controller 18 receives and transmits a fax via the facsimile communication control circuit 16 by using the telephone network 22.

The image reading unit 14 includes a document table for positioning a document, a scanning drive system that scans an image of a document placed on the document table and irradiates the document with light, and a photoelectric conversion element, such as a charge-coupled device (CCD), that receives reflected or transmitted light generated through scanning performed by the scanning drive system and converts the light to an electric signal.

The image forming unit 12 includes a photoconductor drum. Around the photoconductor drum, a charging device, a scanning exposure unit, an image developing unit, a transfer unit, and a cleaning unit are provided. The charging device causes the photoconductor drum to be evenly charged. The scanning exposure unit scans a light beam on the basis of image data. The image developing unit develops an electrostatic latent image that is formed through scanning exposure performed by the scanning exposure unit. The transfer unit transfers the developed image on the photoconductor drum to recording paper. The cleaning unit cleans the surface of the photoconductor drum after a transfer operation has finished. Also, a fixing unit that fixes a transferred image on recording paper is provided along a paper transport path.

In the image processing apparatus 10, a plug 26 is attached to an end of an input power line 24. Inserting the plug 26 into a receptacle 32 for a commercial power source 31 connected to a wall surface W enables the image processing apparatus 10 to be supplied with power from the commercial power source 31. In the image processing apparatus 10 according to the first exemplary embodiment, power is supplied from the commercial power source 31 by turning on/off a main-power-source switch 41. The main-power-source switch 41 is a so-called rocker switch. When the main-power-source switch 41 is operated by a user (person), a rocker operation unit of the main-power-source switch 41 is physically operated to switch between an ON-state and an OFF-state. Thus, whether the main-power-source switch 41 is in an ON-state or an OFF-state is visually perceivable.

The main-power-source switch 41 is provided as one of internal components that are exposed by opening a panel unit 10p (rotating it around the lower side) on a front surface of the image processing apparatus 10.

In the first exemplary embodiment, a sub-power-source operation unit 44 is provided separately from the main-power-source switch 41. The sub-power-source operation unit 44 has a function of selecting an operation mode of each of the above-described devices, to which power is supplied when the main-power-source switch 41 is in an ON-state.

The sub-power-source operation unit 44 is a so-called soft switch, is provided at a portion of the recording paper output tray 10T, and is formed of a push-button switch that automatically recovers. That is, internal electric contacts are in contact with each other while the sub-power-source operation unit 44 is pressed, and the electric contacts are separated from each other when the press is released. The main controller 18 monitors the electric contacts of the sub-power-source operation unit 44. Every time the electric contacts come into contact with each other (every time the sub-power-source operation unit 44 is operated), the main controller 18 determines that an instruction signal for changing the operation mode of a device has been input.

Hardware Configuration of Control System of Image Processing Apparatus

Figure 2:
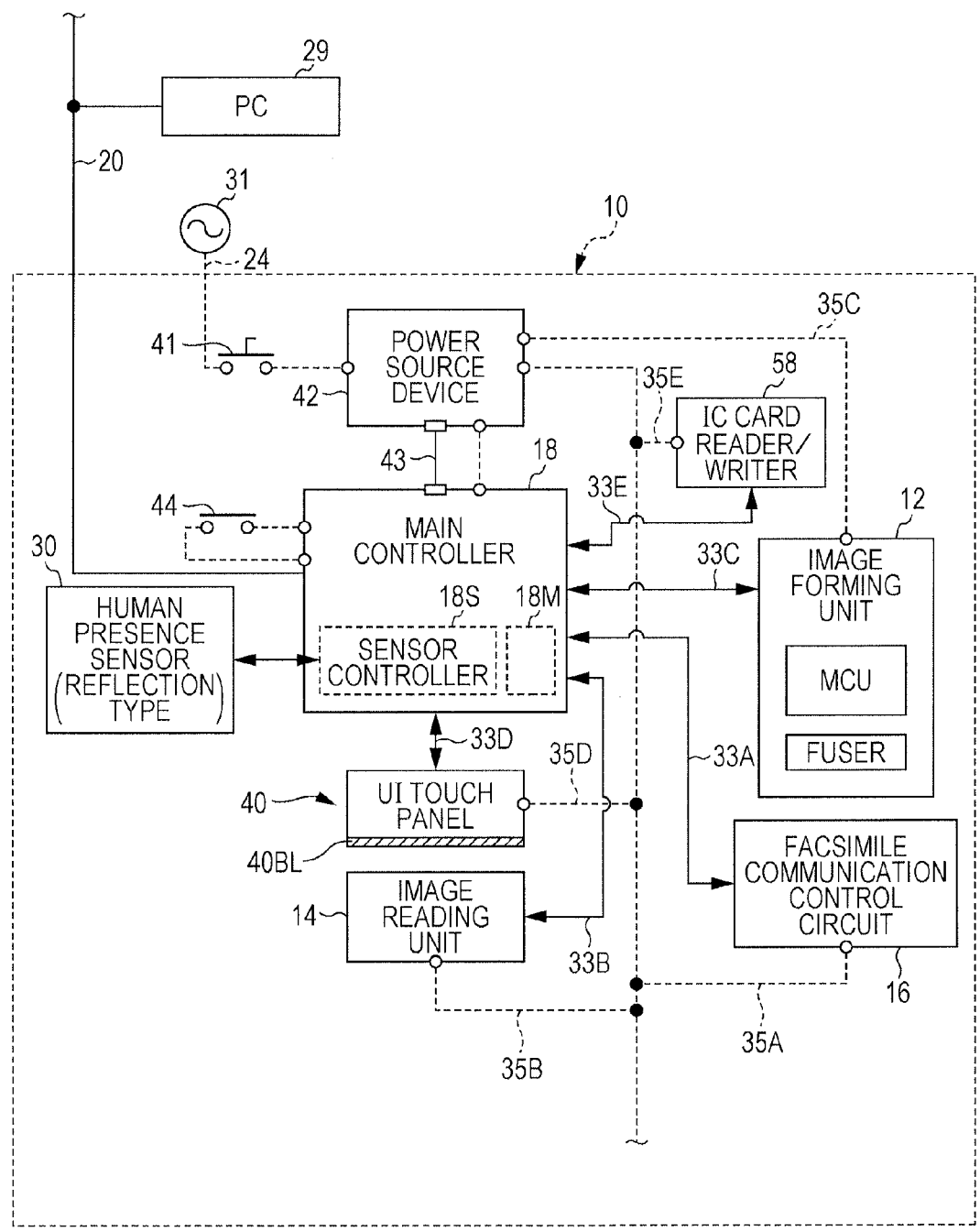
FIG. 2 is a block diagram illustrating the configuration of a power supply system and a control system of the image processing apparatus according to the first exemplary embodiment.

FIG. 2 is a schematic diagram illustrating the hardware configuration of a control system of the image processing apparatus 10.

The communication network 20 is connected to the main controller 18 of the image processing apparatus 10. The PC (terminal apparatus) 29, which may serve as a transmission source of image data, is connected to the communication network 20.

The facsimile communication control circuit 16, the image reading unit 14, the image forming unit 12, a user interface (UI) touch panel 40, and an integrated circuit (IC) card reader/writer 58 are connected to the main controller 18 via buses 33A to 33E such as data buses or control buses, respectively. That is, the main controller 18 controls the individual processing units of the image processing apparatus 10. A backlight unit 40BL is attached to the UI touch panel 40.

Further, the image processing apparatus 10 includes a power source device 42, which is connected to the main controller 18 via a signal harness 43.

The power source device 42 is supplied with power from the commercial power source 31 through the input power line 24. The main-power-source switch 41 is disposed at a point on the input power line 24.

The power source device 42 is connected to power supply lines 35A to 35E for independently supplying power to the main controller 18, the facsimile communication control circuit 16, the image reading unit 14, the image forming unit 12, the UI touch panel 40, and the IC card reader/writer 58. With this configuration, the main controller 18 is capable of individually supplying power (power supply mode) or individually shutting off power (sleep mode) in a working mode of the individual devices (hereinafter also referred to as "processing devices" or the like), so as to perform so-called partial-power-saving control. Although the details will be described below, the image processing apparatus 10 is operable in a working mode or an off mode, and the working mode or the off mode is selected by operating the sub-power-source operation unit 44.

Also, a human presence sensor 30 is connected to the main controller 18. The human presence sensor 30 monitors whether or not a person exists near the image processing apparatus 10, more specifically, whether or not a person exists near the main-power-source switch 41 provided on the image processing apparatus 10 (the details will be described below).

The main-power-source switch 41 may be operated by opening the panel unit 10P, as described above, is a hand-operated switch at the end (for example, a rocker switch) for supplying or shutting off commercial power to the image processing apparatus 10, and may be turned on or off by a user operation.

Turning on of the main-power-source switch 41 causes power to be supplied to the main controller 18 of the image processing apparatus 10, so that a minimal startup operation (initial operation) is executed. The minimal startup operation may be, for example, communication with the communication network 20, or communication with the telephone network 22 for facsimile reception. The operation mode in this state is referred to as an "off mode".

The main controller 18 is provided with the sub-power-source operation unit 44. Turning on of the sub-power-source operation unit 44 causes power from the commercial power source 31 to be supplied to various devices, such as the image reading unit 14, the image forming unit 12, and the facsimile communication control circuit 16, so that a full-operation may be performed. The operation mode in this state is referred to as a "working mode".

The human presence sensor 30 according to the first exemplary embodiment detects the presence or absence of a moving object. A representative example of the sensor used as the human presence sensor 30 is a reflection-type sensor including a light emitting unit and a light receiving unit. The light emitting unit and the light receiving unit may be separated from each other.

The greatest characteristic of a reflection-type sensor or the like that is used as the human presence sensor 30 is reliably detecting the presence or absence of a moving object by blocking or not blocking light that enters the light receiving unit. The amount of light that enters the light receiving unit is limited depending on the amount of light emitted from the light emitting unit, and thus the detection region of the human presence sensor 30 is a relatively close range.

The sensor used as the human presence sensor 30 is not limited to a reflection-type sensor, as long as the following functions may be implemented.

The detection region of the human presence sensor 30 is a region in which a user is capable of operating the UI touch panel 40 or a hard key of the image processing apparatus 10. The region includes a region in which a user operates the main-power-source switch 41. For example, a critical distance for detection (the farthest position from the sensor) is about 0.2 to 1.0 m.

Figure 3:
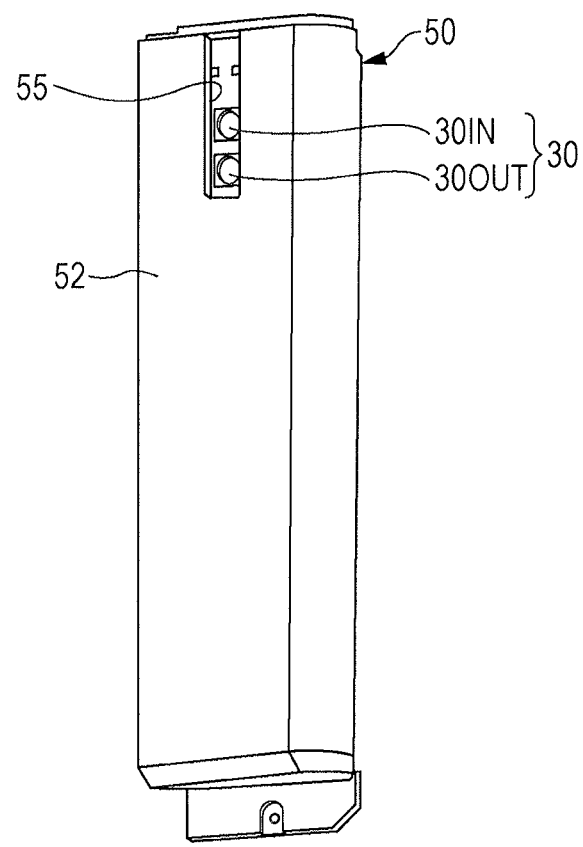
FIG. 3 is an enlarged perspective view illustrating a position where a human presence sensor is attached according to the first exemplary embodiment.

As illustrated in FIG. 1, the human presence sensor 30 is a part of the housing of the image processing apparatus 10, and is provided on a pillar unit 50, which is vertically long and rectangular shaped and which supports the image reading unit 14. The pillar unit 50 serves as a pillar for connecting an upper housing that mainly covers the image reading unit 14 and a lower housing that mainly covers the image forming unit 12. In the pillar unit 50, a recording paper transport system or the like (not illustrated) is provided. FIG. 3 is an enlarged view of the pillar unit 50.

As illustrated in FIG. 3, the front surface of the pillar unit 50 is provided with a cover member 52, which is vertically long and rectangular shaped. The cover member 52 covers the pillar unit 50 and has an aesthetically pleasing design.

As illustrated in FIG. 3, a vertically long slit opening 55 is provided at an upper end portion of the cover member 52. On the back surface side of the slit opening 55, a light receiving unit 30IN and a light emitting unit 30OUT of the human presence sensor 30 are arranged. Although not illustrated, a concealing member whose transmittance is relatively low (50% or less) is provided in the slit opening 55. The concealing member is provided to make it difficult to see the human presence sensor 30 from the outside, thereby ensuring the above-described aesthetically pleasing design. Basically, the detection function of the human presence sensor 30 is maintained.

A cause of the supply of power to the image processing apparatus 10 may be recovery from power failure, as well as an operation of turning on the main-power-source switch 41.

In the first exemplary embodiment, whether the cause of the supply of power is an operation of turning on the main-power-source switch 41 or recovery from power failure is determined on the basis of a detection result about a moving object generated by the human presence sensor 30. The determination is executed by the main controller 18 on the basis of a detection signal output from the human presence sensor 30. In the main controller 18, a sensor controller 18S is started first upon power being supplied.

Figure 4:
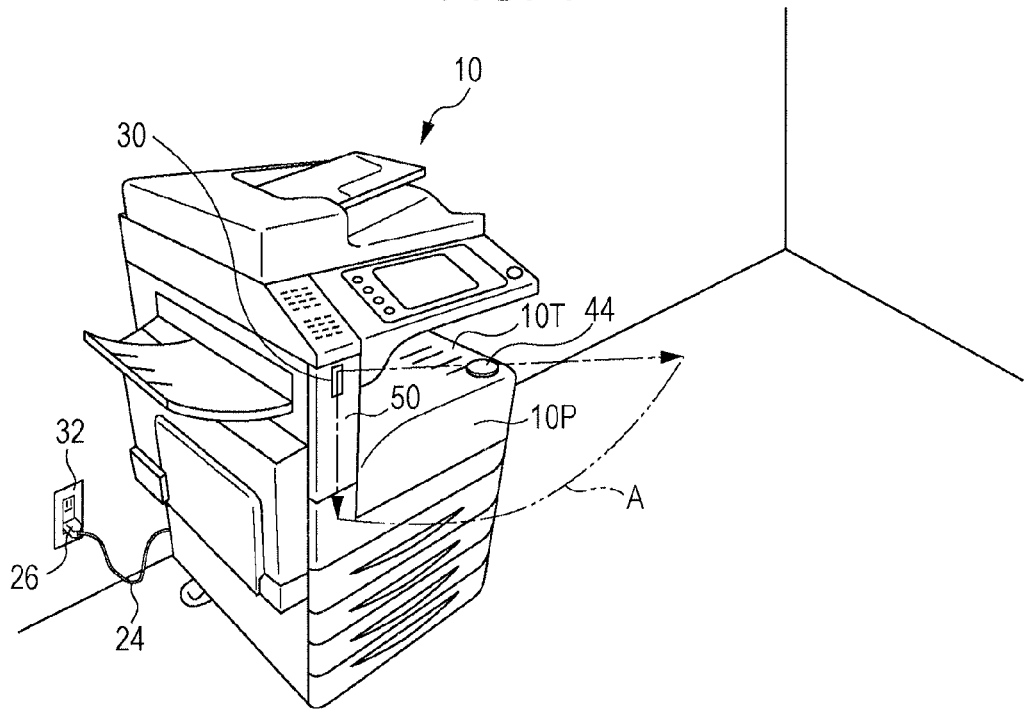
FIG. 4 is a perspective view illustrating the image processing apparatus according to the first exemplary embodiment and a region near the image processing apparatus, and illustrating a state where a person (user) does not exist near the image processing apparatus.

That is, referring to FIG. 4, the sensor controller 18S is started first upon power being supplied. If there is not a moving object 60 (hereinafter also referred to as a "user 60") in a predetermined region near the image processing apparatus 10 (region A in FIG. 4), the sensor controller 18S determines that the cause of the supply of power is recovery from power failure.

Figure 5:
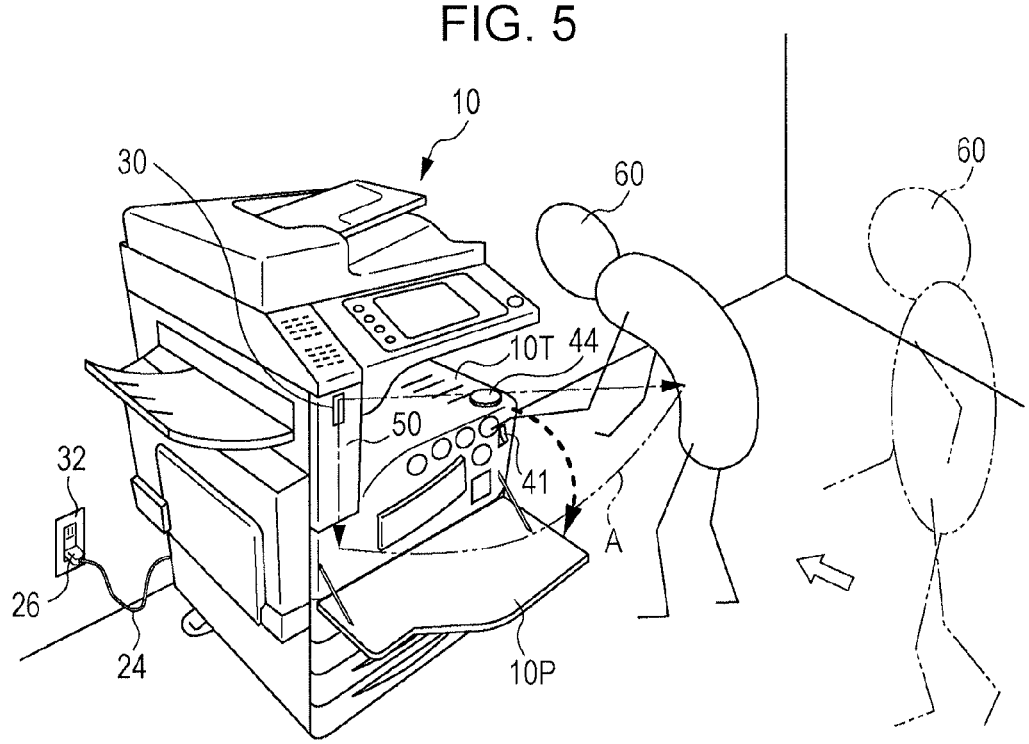
FIG. 5 is a perspective view illustrating the image processing apparatus according to the first exemplary embodiment and a region near the image processing apparatus, and illustrating a state where a person (user) exists near the image processing apparatus.

On the other hand, referring to FIG. 5, when power is supplied, if there is the user 60 in the predetermined region near the image processing apparatus 10 (region A in FIG. 5), the sensor controller 18S determines that the cause of the supply of power is an operation of turning on the main-power-source switch 41, under the assumption that the user 60 is operating the main-power-source switch 41.

In the image processing apparatus 10 according to the first exemplary embodiment, it is not possible to determine whether or not the operation mode of the image processing apparatus 10 at the time of the supply of power is a working mode or an off mode on the basis of the operation state of the sub-power-source operation unit 44, because the sub-power-source operation unit 44 is a soft switch.

Thus, the main controller 18 monitors the operation state of the sub-power-source operation unit 44, and stores, in a nonvolatile memory 18M, information representing the operation mode (working mode or off mode) that is switched every time the sub-power-source operation unit 44 is operated. Accordingly, information representing the operation mode just before power shutoff occurs is stored in the nonvolatile memory 18M.

The main controller 18 sets the operation mode at the time of the supply of power on the basis of operation information about the main-power-source switch 41 that is based on detection by the human presence sensor 30 executed by preferential startup of the sensor controller 18S, and information representing the operation mode just before power shutoff occurs, stored in the nonvolatile memory 18M.

Accordingly, compared to a case where the operation mode at the time of the supply of power is simply unified to the off mode or the working mode if the operation mode is not identifiable because a soft switch is used as the sub-power-source operation unit 44, the convenience after power has been supplied is increased.

Further, information representing an operation mode that is not identifiable because a soft switch is used as the sub-power-source operation unit 44 is stored in the nonvolatile memory 18M. Accordingly, upon recovery from power failure, the operation mode is returned to the mode just before power failure occurs.

In the first exemplary embodiment, an operation mode is selected in accordance with the following rule.

(Rule 1) When power is supplied in response to an operation of turning on the main-power-source switch 41, the operation mode is set to be the working mode.

This is because, when the user 60 exists near the image processing apparatus 10, it is highly possible that the user 60 will use the image processing apparatus 10, and a high priority is given to the convenience in which the operation mode is immediately set to be the working mode.

(Rule 2) When power is supplied without an operation of turning on the main-power-source switch 41, the operation mode is selected in accordance with information representing an operation mode stored in the nonvolatile memory 18M.

(1) In a case where the operation mode represented by the information stored in the nonvolatile memory 18M is the off mode, the off mode is selected.

(2) In a case where the operation mode represented by the information stored in the nonvolatile memory 18M is the working mode, the working mode is selected.

This is because, setting the same operation mode before and after the occurrence of power failure prevents an actual operation mode from being different from the operation mode that is predictable by the user 60.

Hereinafter, the operation of the first exemplary embodiment will be described with reference to the flowcharts in FIGS. 6 and 7, and the timing chart in FIG. 8.

Figure 6:
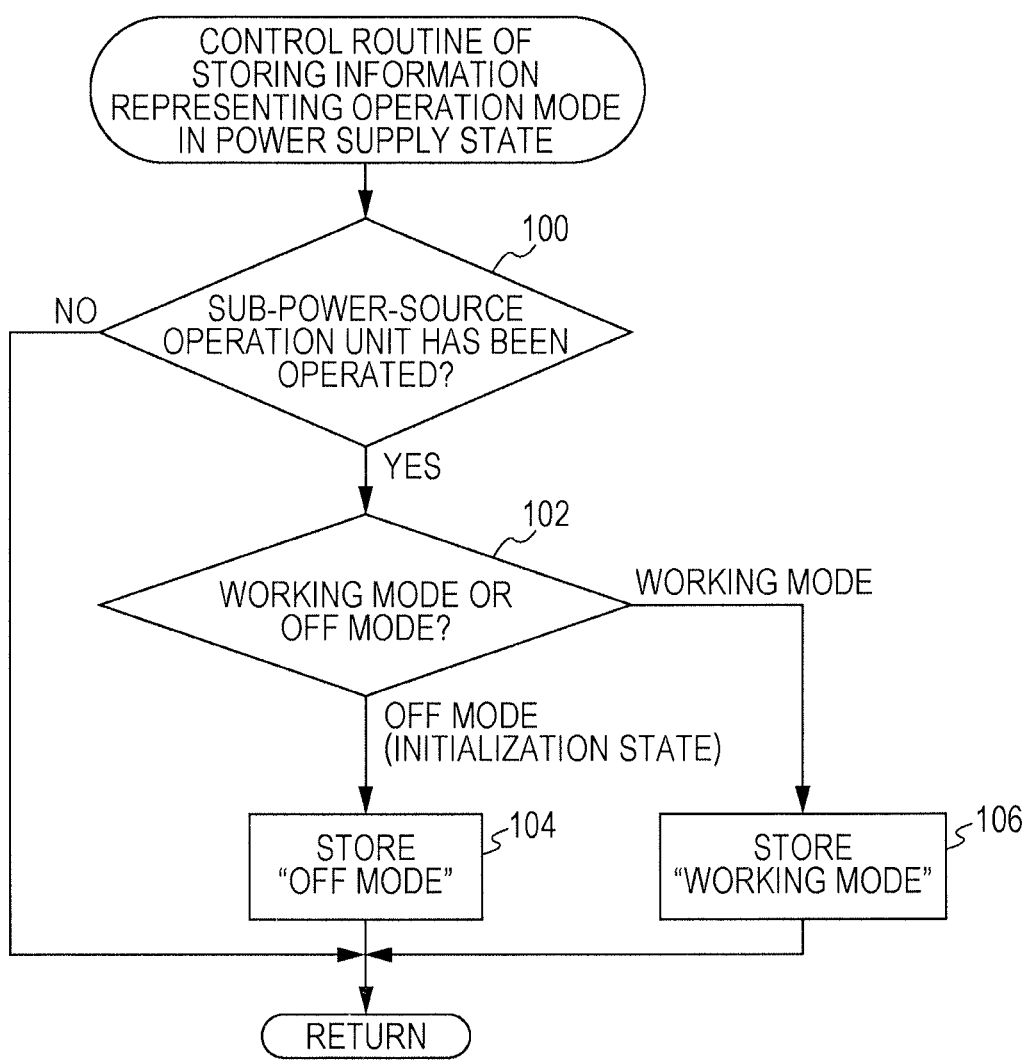
FIG. 6 is a flowchart illustrating a control routine of storing information representing an operation mode in a power supply state, the routine being executed by a main controller according to the first exemplary embodiment.

FIG. 6 is a flowchart illustrating a control routine of storing information representing an operation mode in a power supply state, which is executed by the main controller 18. Although not illustrated, the main controller 18 executes management control for managing the operation statuses of individual devices, and the flowcharts in FIGS. 6 and 7 illustrate the sub-routines of the management control.

In step 100, the main controller 18 determines whether or not the sub-power-source operation unit 44 has been operated. Since the sub-power-source operation unit 44 is a so-called soft switch, the main controller 18 performs the determination by monitoring the switching state of the contacts of the sub-power-source operation unit 44.

If a negative determination result is obtained in step 100, the main controller 18 determines that the user does not want to change the operation mode, and this routine ends. If a positive determination result is obtained in step 100, the main controller 18 determines that the user wants to change the operation mode, and the process proceeds to step 102.

In step 102, the main controller 18 determines whether the instruction provided through the operation indicates the working mode or off mode. That is, regarding the sub-power-source operation unit 44, an operation for changing the operation mode from the off mode to the working mode is the same as an operation for changing the operation mode from the working mode to the off mode. An operation that is performed when the present operation mode is the working mode is an operation for changing the operation mode to the off mode. An operation that is performed when the present operation mode is the off mode is an operation for changing the operation mode to the working mode.

If it is determined in step 102 that the instruction indicates the off mode, the process proceeds to step 104, where the main controller 18 stores information representing "off mode" as an operation mode in the nonvolatile memory 18M. Then, this routine ends.

If it is determined in step 102 that the instruction indicates the working mode, the process proceeds to step 106, where the main controller 18 stores information representing "working mode" as an operation mode in the nonvolatile memory 18M. Then, this routine ends.

Figure 7:
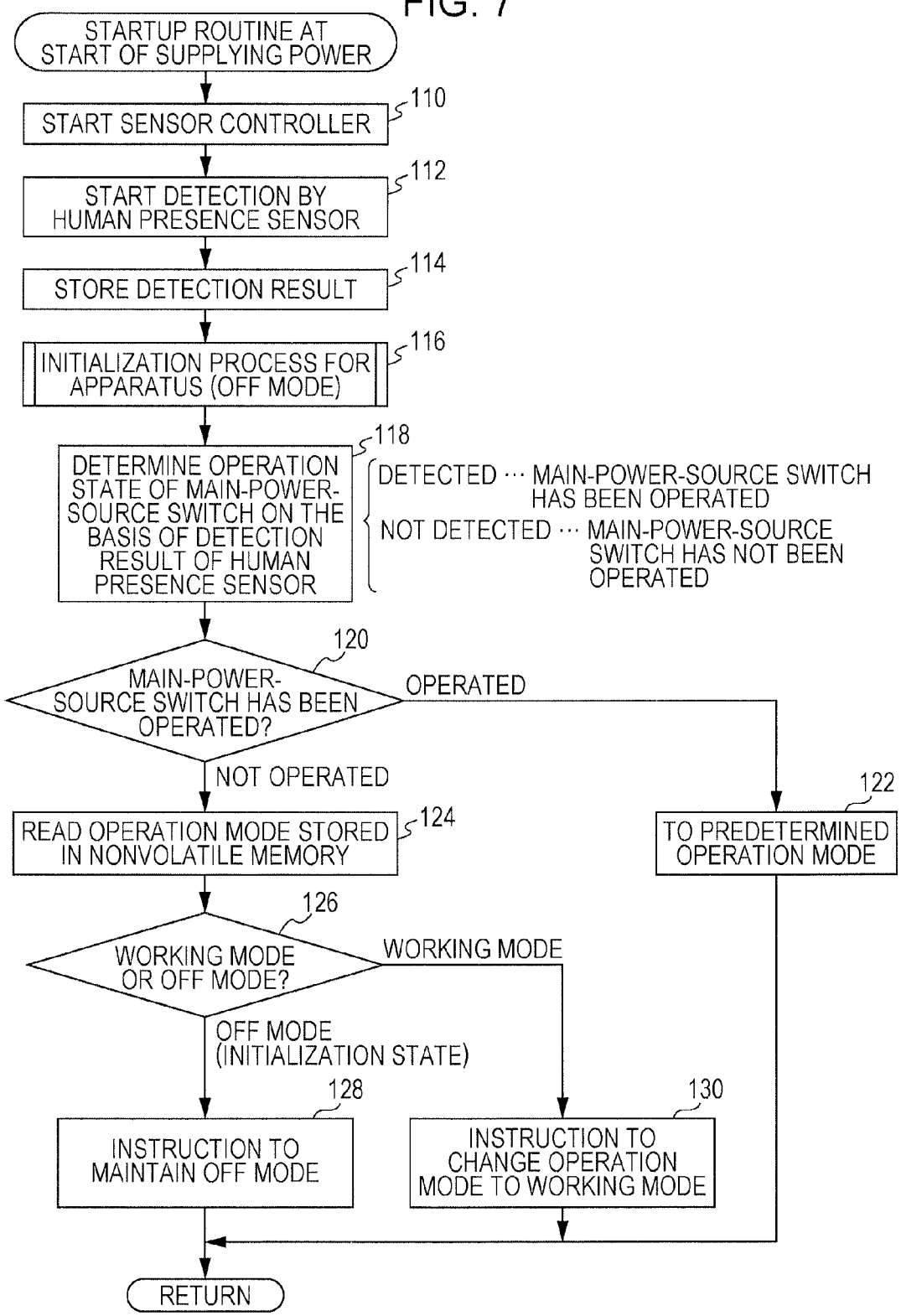
FIG. 7 is a flowchart illustrating a startup routine at the start of the supply of power, the routine being executed by the main controller according to the first exemplary embodiment.

FIG. 7 illustrates a routine that is started when the supply of power starts and that is executed by the main controller 18.

In step 110, the sensor controller 18S is started first. Accordingly, upon power being supplied, the human presence sensor 30 is capable of monitoring whether or not the user 60 exists near the image processing apparatus 10 (see region A illustrated in FIGS. 4 and 5).

In step 112, detection by the human presence sensor 30 is started. In step 114, a detection result (information indicating whether or not the user 60 exists) is temporarily stored, and the process proceeds to step 116. The detection result is not necessarily dynamic. For example, information representing a detection state just after the sensor controller 18S is started or after a certain time period has elapsed may be stored as a bit signal (flag) or the like. The certain time period is about 0.5 to 1.0 seconds.

In step 116, the main controller 18 executes an initialization process for the image processing apparatus 10. After the initialization process, the process proceeds to step 118. In the initialization process, the operation mode is eventually set to be the off mode, and a standby state starts.

In step 118, the main controller 18 determines the operation state of the main-power-source switch 41 on the basis of the temporarily stored information indicating whether or not the user 60 exists, detected by the human presence sensor 30. Specifically, the main controller 18 determines that the main-power-source switch 41 has been operated if the user 60 is detected, and determines that the main-power-source switch 41 has not been operated if the user 60 is not detected.

In step 120, the process branches in accordance with the determination result obtained in step 118. That is, if the main-power-source switch 41 has been operated, the process proceeds from step 120 to step 122, and the main controller 18 provides an instruction to change the operation mode to a predetermined operation mode. Then, this routine ends.

If the main-power-source switch 41 has not been operated, the process proceeds from step 120 to step 124, and the main controller 18 reads information representing an operation mode from the nonvolatile memory 18M.

Subsequently, in step 126, the main controller 18 determines the operation mode represented by the stored information. If the operation mode is the off mode, the process proceeds to step 128, and the main controller 18 provides an instruction to maintain the present operation mode, that is, the off mode. Then, this routine ends.

On the other hand, if it is determined in step 126 that the operation mode represented by the stored information is the working mode, the process proceeds to step 130, and the main controller 18 provides an instruction to change the operation mode from the off mode to the working mode. Then, this routine ends.

Figure 8:
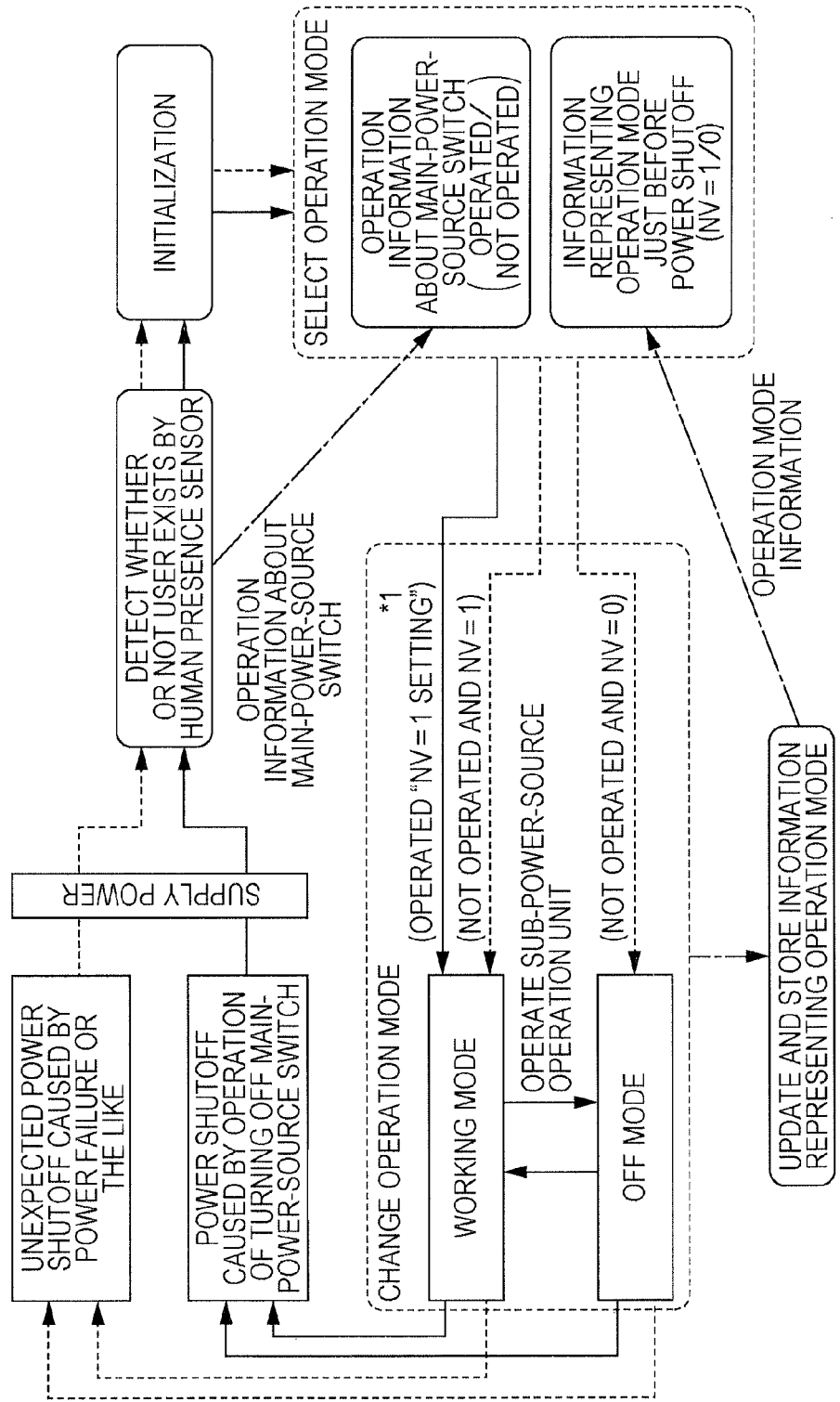
FIG. 8 is a timing chart illustrating a transition state between a power supply state and a power shutoff state according to the first exemplary embodiment.

FIG. 8 is a timing chart illustrating state transitions based on the flowcharts in FIGS. 6 and 7. Thus, part of the description given below may be duplicate.

The types of power shutoff include unexpected power shutoff caused by power failure or the like and power shutoff caused by an operation of turning off the main-power-source switch 41. When power is supplied after power shutoff occurs, it is difficult to determine which of these states is the cause of power shutoff.

Thus, whether or not the user 60 exists is detected by using the human presence sensor 30, and the detection result is stored as operation information about the main-power-source switch 41.

After that, an initialization process for the image processing apparatus 10 is performed. In this initialization process, the operation mode is eventually set to be the off mode.

Here, if the image processing apparatus 10 is constantly kept waiting in the off mode, the convenience for the user 60 who wants to immediately operate the apparatus may be reduced in a case where power is supplied in response to an operation of turning on the main-power-source switch 41. On the other hand, if the operation mode is constantly changed to the working mode, the operation mode is different before and after power failure occurs if the operation mode before power failure occurs is the off mode. This may be inconvenient to the user 60.

Thus, information representing the operation mode of the image processing apparatus 10 is stored in an updating manner, and the operation mode is selected on the basis of the stored information representing the operation mode just before power shutoff occurs and the above-described operation information about the main-power-source switch 41.

If the main-power-source switch 41 has been operated and if the operation mode at power-on is the working mode, the main controller 18 selects the working mode. If the operation mode at power-on is the off mode, the main controller 18 may select the off mode. That is, the operation mode at power-on may be set as a default in accordance with the usability for the user 60.

If the main-power-source switch 41 has not been operated and if the operation mode just before power failure occurs represented by the stored information is the working mode, the main controller 18 selects the working mode.

If the main-power-source switch 41 has not been operated and if the operation mode just before power failure occurs represented by the stored information is the off mode, the main controller 18 selects the off mode.

Second Exemplary Embodiment

Hereinafter, a second exemplary embodiment will be described.

In the first exemplary embodiment, the operation state of the main-power-source switch 41 is detected by using the human presence sensor 30, that is, if the user 60 exists near the image processing apparatus 10 (in region A illustrated in FIGS. 4 and 5), it is indirectly determined that the user 60 is performing an operation of turning on the main-power-source switch 41.

In contrast, the feature of the second exemplary embodiment is directly detecting an operation of turning on the main-power-source switch 41.

Figure 9:
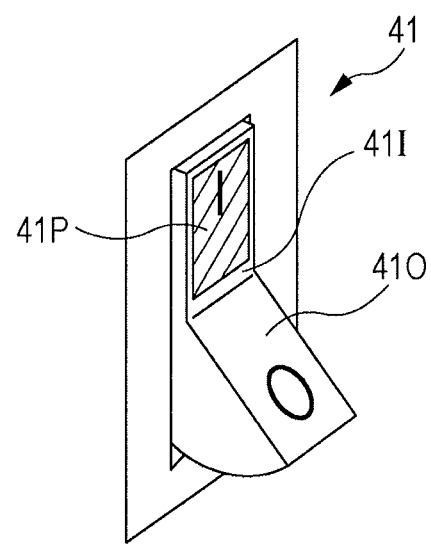
FIG. 9 is a perspective view illustrating a main-power-source switch according to a second exemplary embodiment.

As illustrated in FIG. 9, the main-power-source switch 41 is a rocker switch in which an ON-surface 41I (the surface with a symbol "I") and an OFF-surface 41O (the surface with a symbol "O") are continuously arranged with a certain angle formed therebetween.

In the second exemplary embodiment, a sheet-like pressure sensor 41P is pasted on the ON-surface 41I of the main-power-source switch 41.

The pressure sensor 41P outputs a different signal depending on whether or not a pressure applied thereto is higher than or equal to a predetermined threshold, and outputs at least a binary signal.

Therefore, when the user 60 performs an operation of turning on the main-power-source switch 41, a pressure is applied to the pressure sensor 41P. The signal output at this time is different from the signal output when an operation other than the operation of turning on the main-power-source switch 41 is performed, and thus the operation of turning on the main-power-source switch 41 may be directly detected.

FIG. 10 is a transition diagram illustrating a flow of switching of the main-power-source switch 41 and the pressure sensor 41P.

In an initial state, the main-power-source switch 41 is in an OFF-state, and a finger of the user 60 is not in contact with the pressure sensor 41P. In an operation of pressing the ON-surface 41I of the main-power-source switch 41, a finger of the user 60 comes into contact with the pressure sensor 41P first, and the pressure sensor 41P comes into an ON-state.

Subsequently, if the finger of the user 60 continues pressing the ON-surface 41I, inclination of the main-power-source switch 41 changes, and the contacts of the main-power-source switch 41 are switched. After the switching, the user 60 goes away from the main-power-source switch 41.

That is, there is a time lag of a certain period between when the main-power-source switch 41 is turned on and when the user 60 goes away from the main-power-source switch 41. If the certain period is regarded as a period for determining the state of the pressure sensor 41P, the operation of turning on the main-power-source switch 41 may be directly detected.

Alternatively, the structure of the main-power-source switch 41 may be changed to, for example, a structure with which a single operation enables an operation of switching contacts of two or more different circuits. In this case, one of the two circuits may be used as a circuit for supplying power, and the other circuit may be used as a circuit for monitoring operations.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A startup operation control apparatus comprising:
   a main-power-source operation unit that is configured to supply and shut off power from a power source;
   a determining unit configured to determine whether or not the main-power-source operation unit has been operated;
   a memory configured to, every time an operation mode of a processing device that operates by receiving power supply from the power source changes, store information representing the changed operation mode in an updating manner;
   a controller configured to, in response to the determining unit determining, upon a shift from a power shutoff state to a power supply state, that the main-power-source operation unit has not been operated, perform control so that the processing device operates in the operation mode represented by the information stored in the memory; and
   a sub-power-source operation unit that is effective in a state where power from the power source is supplied in response to an operation of the main-power-source operation unit, and that is configured to cause an instruction signal to be generated, the instruction signal providing an instruction to change the operation mode every time an identical operation is executed.

2. The startup operation control apparatus according to claim 1, wherein, in response to the determining unit determining, upon a shift from a power shutoff state to a power supply state, that the main-power-source operation unit has been operated, the controller performs control so that the processing device operates in a predetermined operation mode.

3. The startup operation control apparatus according to claim 1, wherein the determining unit includes a moving object detecting unit configured to detect whether or not a moving object exists in a certain region, and the determining unit is configured to determine that the main-power-source operation unit has been operated in response to the moving object detecting unit detecting the existence of a moving object.

4. The startup operation control apparatus according to claim 1, wherein the determining unit includes an operation state detecting unit configured to directly detect an operation state of the main-power-source operation unit, and the determining unit is configured to determine that the main-power-source operation unit has been operated in response to the operation state detecting unit detecting an operation state.

5. An image processing apparatus comprising:
   a main-power-source operation unit that is configured to supply and shut off power from a power source;
   a determining unit configured to determine whether or not the main-power-source operation unit has been operated;
   a sub-power-source operation unit configured to operate in a state where power from the power source is supplied in response to an operation of the main-power-source operation unit, and that is configured to cause an instruction signal to be generated, the instruction signal providing an instruction to change the operation mode every time an identical operation is executed;
   a processing device that is configured to operate by receiving power supply from the power source, that is configured to be shifted to an operation mode specified by an operation of the sub-power-source operation unit, and that is configured to execute processing regarding image processing;

a memory configured to, every time an operation mode of the processing device changes, store information representing the changed operation mode in an updating manner; and a controller configured to, in response to the determining unit determining, upon a shift from a power shutoff state to a power supply state, that the main-power-source operation unit has not been operated, perform control so that the processing device operates in the operation mode represented by the information stored in the memory, and that is configured to, in response to the determining unit determining, upon a shift from a power shutoff state to a power supply state, that the main-power-source operation unit has been operated, perform control so that the processing device operates in a predetermined operation mode.

6. The image processing apparatus according to claim 5, wherein the processing device includes at least one of an image reading processing unit configured to read an image from a document image, an image forming processing unit configured to form an image on recording paper in accordance with image information, and a facsimile communication processing unit configured to transmit and receive an image in accordance with a communication procedure that is predetermined between the facsimile communication processing unit and another device, and wherein the processing device is configured such that the operation mode of the processing device is switched to at least an operation standby state or a power saving state every time the sub-power-source operation unit is operated.

7. A startup operation control method comprising:
  determining whether or not a main-power-source operation unit has been operated, the main-power-source operation unit being operated to supply and shut off power from a power source;
  every time an operation mode of a processing device that operates by receiving power supply from the power source changes, storing information representing the changed operation mode in an updating manner;
  in response to determining, upon a shift from a power shutoff state to a power supply state, that the main-power-source operation unit has not been operated, performing control so that the processing device operates in the operation mode represented by the stored information; and
  causing, by a sub-power-source operation unit that is effective in a state where power from the power source is supplied, in response to an operation of the main-power-source operation unit, an instruction signal to be generated, the instruction signal providing an instruction to change the operation mode every time an identical operation is executed.

8. A non-transitory computer readable medium storing a program causing a computer to execute a process, the process comprising:
  every time an operation mode of a processing device that operates by receiving power supply from a power source changes, storing information representing the changed operation mode in a memory in an updating manner;
  determining, upon a shift from a power shutoff state to a power supply state, whether or not a main-power-source operation unit has been operated, the main-power-source operation unit being operated to supply and shut off power from the power source;
  performing control so that the processing device operates in the operation mode represented by the stored information, in response to determining that the main-power-source operation unit has not been operated;
  performing control so that the processing device operates in a predetermined operation mode, in response to determining that the main-power-source operation unit has been operated; and
  causing, by a sub-power-source operation unit that is effective in a state where power from the power source is supplied, in response to an operation of the main-power-source operation unit, an instruction signal to be generated, the instruction signal providing an instruction to change the operation mode every time an identical operation is executed.

* * * * *